United States Patent [19]

Haskell et al.

[11] 4,378,713

[45] Apr. 5, 1983

[54] SELF-ADJUSTING CABLE CONTROL DEVICE

[75] Inventors: Hugh H. Haskell, Kent, England; William J. Gilmore, Manitou Beach, Mich.

[73] Assignee: Acco Industries Inc., Trumbull, Conn.

[21] Appl. No.: 158,315

[22] Filed: Jun. 10, 1980

[51] Int. Cl.³ .................. F16C 1/22; F16D 13/75; F16D 65/52
[52] U.S. Cl. .................. 74/501.5 R; 188/196 R; 188/196 B; 192/111 A
[58] Field of Search ............. 74/501.5 R; 192/111 A; 188/196 R, 196 B

[56] References Cited

U.S. PATENT DOCUMENTS

| | | | |
|---|---|---|---|
| 1,655,366 | 1/1928 | Hannah | 188/196 R |
| 1,804,309 | 5/1931 | Bourbeau | 188/196 B |
| 2,035,228 | 3/1936 | Gallusser | 188/196 B |
| 4,057,135 | 11/1977 | Mori | 188/196 B |

FOREIGN PATENT DOCUMENTS 2910421  9/1979  Fed. Rep. of Germany ... 192/111 A

*Primary Examiner*—Kenneth Dorner
*Attorney, Agent, or Firm*—Pennie & Edmonds

[57] ABSTRACT

A self-adjusting cable control device for automatically compensating for wear in a control cable system. The device includes a termination member connected at one end of a control cable and a connecting member attached to an actuation member. The connecting member carries a clutch for locking with the termination member upon application of force to the actuation member. Spring means are provided to move the cable with respect to the actuation member when the clutch is disengaged from the termination member.

6 Claims, 7 Drawing Figures

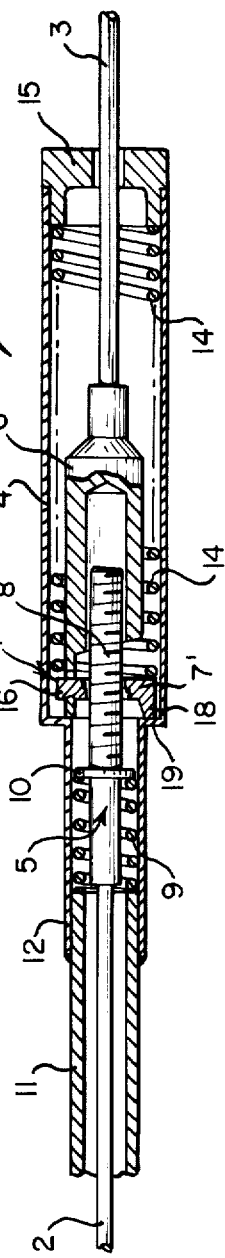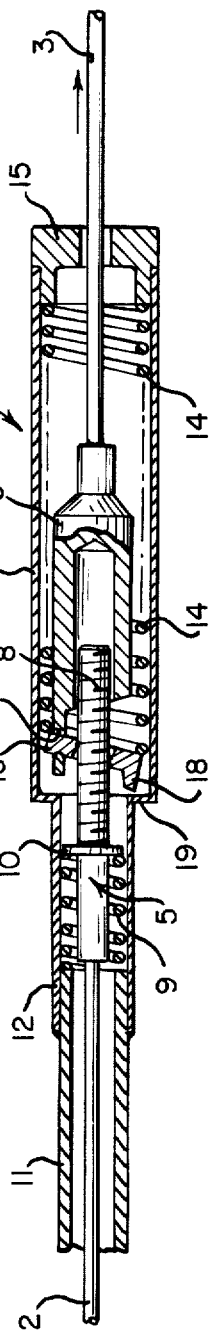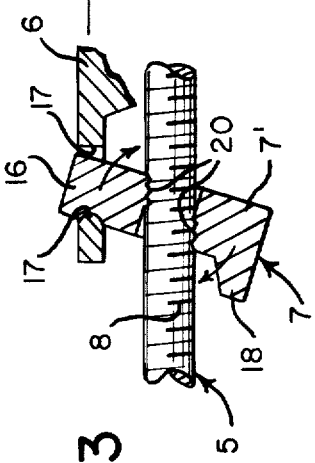

SELF-ADJUSTING CABLE CONTROL DEVICE

TECHNICAL FIELD

The invention relates to a self-adjusting cable control device which will automatically compensate for wear in a control cable system to insure that proper tension and tolerances are maintained in the system.

BACKGROUND OF THE INVENTION

Cable operated controls are utilized in a number of control systems. For example a clutch mechanism in a manual shift automobile is often connected by means of a flexible control cable to a clutch pedal mounted on the fire wall separating the engine compartment from the passenger compartment. In addition flexible control cables are often utilized in brake systems where a brake is connected by means of a flexible control cable to a brake pedal also mounted on a fire wall.

The control cables in such systems often require adjustment in order to accommodate manufacturing tolerances in the cable itself or in the controlled member operated by the cable. Further adjustment may be required after a period of use to accommodate wear in the cable and attachments including sheaves or in the member controlled by the cable.

For example in a manual shift system, the clutch mechanism facing plate wears during use resulting in the relatively heavy clutch spring drawing the control cable further towards the clutch mechanism and effectively shortening the cable whereby play will be introduced between the clutch pedal and the control cable. In brake systems, the opposite result occurs, that is, the effective length of the cable is lengthened as brake shoes wear down again resulting in undesirable play being introduced into the brake system.

Such cable control systems can be adjusted manually to achieve the desired regulation but this usually requires shutting down of the system (in the case of an automobile, taking it to a garage) and obtaining the services of a mechanic.

Various structures have been proposed in the past to provide for a self-adjusting feature to assure proper tensioning of a control cable in a control system. Such devices have, however, been expensive to manufacture and often took up an undue amount of space. In many vehicles, particularly compact vehicles, space in the engine compartment is limited and it is often difficult to provide space between the fire wall and a member to be controlled in which to position any self-adjusting control device.

It is therefore an object of our invention to provide for a self-adjusting control device which is inexpensive to manufacture and which will be able to accommodate either effective shortening or lengthening of the control cable due to wear of parts making up the control cable system or as may be required to accommodate manufacturing tolerances.

It is a further object of our invention to provide for a self-adjusting control cable device which will occupy a minimum amount of space and which may be anchored to a fire wall separating the engine and passenger compartments or may be included anywhere in the control system between the member to be controlled and an actuation member for effectuating control.

GENERAL DESCRIPTION OF THE INVENTION

Broadly a self-adjusting control cable device according to our invention includes a termination member which is adapted to be connected to the end of a cable extending to a controlled member such as a manual gear shift clutch mechanism or brake. The device also includes a connecting member adapted to connect with a flexible cable or rod leading to an actuation member such as a brake or clutch pedal. A main housing surrounds the termination and connecting members. A first spring means is included for urging the termination member towards the connecting member and a second spring means is included for urging the connecting member towards the termination member. A clutch means is carried by the connecting member and is adapted to engage and lock with the termination member when the connecting member is moved against the force of the second spring means by the actuation member. Engagement and locking of the clutch with the termination member will then pull the control cable to actuate the controlled member. When force is released from the actuation member, the second spring means will move the connecting means and clutch means towards the termination member allowing the clutch means to disengage from the termination member. The termination member and control cable are then free to move with respect to the connecting means to accommodate for any wear in the system. Thus in a brake system, the termination end will be urged to move towards the connecting member by the force of the first spring means to take up any slack in the control cable. In the case of a clutch mechanism in a manual gear shift system, the termination end will be free to move away from the connecting member under the force of the heavy clutch spring of the clutch mechanism.

The main housing may be anchored to a wall, such as a fire wall separating the engine and operator compartments of a vehicle, or the device may be anchored between cable conduits extending between the controlled member and the fire wall.

In one form of the invention, the clutch means comprises an annular collar which fits loosely around the termination member and which has an ear fitting into a slot in the connecting member. As the connecting member is moved away from the termination member, the annular collar will tilt such that its inside periphery will engage and lock with the termination member. Both the inside periphery of the annular collar and the outside surface of the termination member may have serrated surfaces to better insure a locking engagement between the two parts.

In a further embodiment of the invention, the connecting member comprises a circular housing and the clutch means comprises at least one radially movable collet piece carried by the connecting member. The connecting member has a tapered surface adapted to engage the collet piece and move it radially inwardly of the termination piece when the connecting member is moved away from the termination member by a force being applied to an actuation member. A third spring means is operatively positioned between the collet piece and the circular housing to urge the collect piece to a locked position with respect to the termination member. A stop is provided in the main housing to limit movement of the circular housing towards the termination member under the force of the second spring means and to also limit movement of the collet piece.

In both embodiments of the invention, the first spring means is preferably operatively positioned between the main housing and the termination member and the second spring means is preferably operatively positioned between the main housing and the connecting member.

BRIEF DESCRIPTION OF THE DRAWINGS

FIG. 1 is a side sectional view of a self-adjusting cable control device constructed according to the invention in a relaxed position where a control cable is free to move and adjust its length with respect to the device;

FIG. 2 is a view similar to FIG. 1 illustrating the device in the actuated position operatively connecting the control cable with an actuation member;

FIG. 3 is an enlarged view of the clutch means of the device of FIG. 1;

BEST MODES FOR CARRYING OUT THE INVENTION

Figure 4:
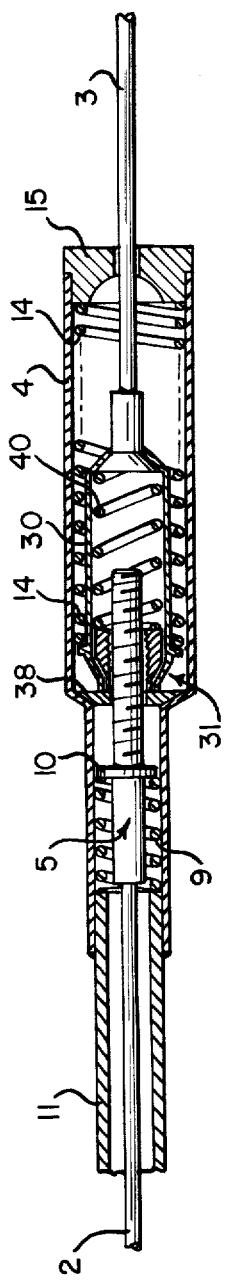
FIG. 4 is a side sectional view of a further embodiment of a self-adjusting control cable device constructed according to the invention showing the device in the relaxed position with a control cable free to move with respect to the device.

Referring to FIG. 1, there is illustrated a self-adjusting cable control device 1 for connecting a flexible control cable 2 to a rod or cable 3 which for the purposes of this disclosure may be considered part of an actuation member, for example a brake or clutch pedal, not shown. Cable 2 may extend to a controlled member, not shown, for example a manual gear clutch mechanism or brake. The controlled member, cable 2 and actuation member 3 together form a control cable system.

The device 1 includes a main housing 4 which surrounds a termination member 5 connected to the end of cable 2. The actuation member 3 has a connecting member 6 on the end thereof in the form of a yoke which carries a clutch 7 in the form of an annular collar 7' which fits loosely around a serrated portion 8 of the termination member 5.

A first spring 9 is preferably operatively positioned between the termination member 5 and the main housing 4 to urge the member 5 and cable 2 to the right as shown in the figure towards the connecting member 6. More specifically, the spring 9 bears at one end on a shoulder 10 contained on the termination member and at its other end on a flexible conduit 11 which is fixed to the extension 12 of the main housing 4. A second spring 14 is operatively positioned between the main housing and the connecting member 6 to urge the connecting member and actuation member 3 to the left as shown in the figure to move the connecting member towards the termination member. Specifically the spring 14 bears at one end on a plug 15 contained in the end of the main housing and at its other end on the annular collar 7' carried by the connecting member.

The annular collar 7' has an ear 16 which fits into a slot 17 as more clearly shown in FIG. 3 so that as the connecting member moves longitudinally with respect to the device, the collar will also be moved longitudinally. The annular collar 7' also has a tab 18 adapted to seat on the shoulder 19 of the main housing. As shown in FIG. 1, the tab 18 and the ear 16 serve to align the collar with respect to the termination member when the end of the connecting member and the tab seat on the shoulder 19 under the force of the second spring 14. Since the annular collar 7' has a loose fit with the termination member 5, the termination member and cable 2 will be free to move longitudinally with respect to the connecting member and actuation member when the members are in the position shown in FIG. 1.

When the actuation member is moved to the right as shown in FIGS. 2 and 3, the annular collar will be tilted by the force of the spring 14 urging the tab 18 to the left while the ear 16 is pulled to the right by engagement with the slot 17 in the connecting member. The tilting action of the annular collar will cause its inner periphery to engage the outside surface of the termination member whereby the termination member and control cable 2 will be moved to the right. In order to ensure a positive locking engagement of the collar with the termination member, the inner surface of the collar is preferably serrated at the portion 20 to match the serrated portion 8 of the termination member. The serrations may result from threading as shown in FIG. 3 or could comprise annular grooves.

The operation of the device is as follows. When the device is shown in the position of FIG. 1, it is in a relaxed position during which no actuation force is being applied to the actuation member 3. The termination member is then free to move either to the left or right with respect to the connecting member and actuation member whereby cable 2 may adjust its effective length as needed. For example if the effective length is to be shortened to compensate for wear in a brake, stretch of the cable or wear in cable sheaves, spring 9 will urge the termination end to the right to effectively shorten the cable 2. If on the other hand the effective length of the cable 2 is to be lengthened as would occur on wear of a manual gear shift clutch mechanism, the heavy clutch spring of the mechanism (not shown) would pull the cable and termination member to the left as shown in the drawing against the force of the weaker spring 9 which serves to keep cable 2 taut.

When an actuation force is applied to the actuation member 3 to move it to the right as shown in FIG. 2, as for example by depressing a brake or clutch pedal, the connecting member will also be moved to the right. The collar 7' acting as a clutch will then tilt to lock with the termination member drawing it and cable 2 to the right and thus actuating the controlled member. Upon release of force, spring 14 will move the device back to the relaxed position of FIG. 1 where the collar disengages from the termination member thus again releasing the cable 2 for adjusting movement.

The main housing 4 may be anchored by mounting it directly on a fire wall. If this cannot be done because of space considerations, the main housing may be anchored against movement by fixing it between cable conduits surrounding and guiding the control cable 2 and cable or rod 3 forming part of the actuation member. While only one conduit 11 is shown in FIG. 1, it is to be understood that a further conduit could surround guide cable or rod 3. Further it is to be understood that if the main housing 4 is anchored by mounting on a fire wall, it may not be necessary to use cable conduits particularly if cable 2 is in the form of a rod.

While the first spring 9 is shown as being preferably operatively positioned between the termination end and the housing, it could be substituted by a spring means in the controlled member which would exert a compressive force on control cable 2 tending to move it to the right as shown in FIG. 1 whereby the termination end would be moved towards the connecting member.

Figure 5:
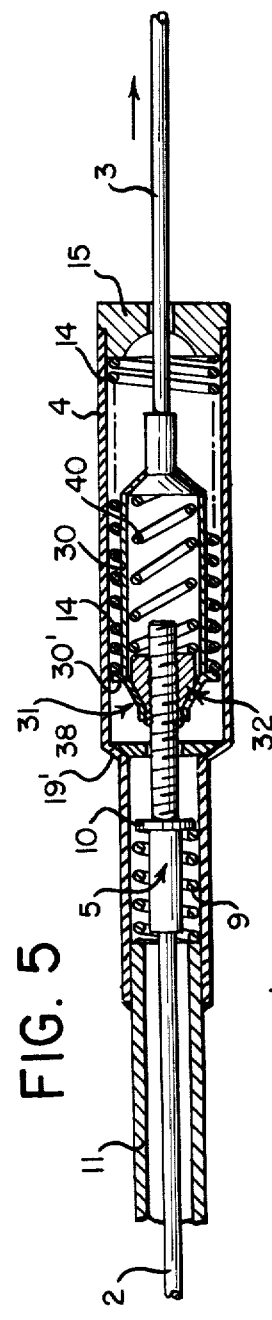
FIG. 5 is a view similar to FIG. 4 showing the device in the actuated position operatively connecting the control cable with an actuation member.

Referring to FIGS. 4–6, a further form of a self-adjusting cable control device is shown in which parts similar to the parts of the device shown in FIGS. 1–3 have the same identifying numerals. The main difference in this form from the one shown in FIGS. 1–3 is in the construction of the clutch.

As shown in FIGS. 4–6, the rod or cable 3 forming part of the actuation member has a circular housing 30 acting as a connecting member. The circular housing has a flange 30' against which the second spring 14 bears in order to urge the housing to the left as shown in the Figures. The circular housing 30 in addition carries a clutch 31 in the form of a collet 32 having a plurality of collet pieces 33 which are movable radially to engage and disengage with the serrated portion 8 of the termination member 5.

The circular housing 30 also has a tapered portion 34 adapted to engage tapered surfaces 35 of the collet pieces 33 to move the pieces radially inwardly towards the termination piece whereby the serrated portions 36 of the collet pieces will engage and lock with the serrated portion 8. The circular housing 30 has a bead 37 on the end of the tapered portion 34 which is adapted to bear on a stop 38 within the main housing 4 when the device is in the relaxed position as shown in FIGS. 4 and 6A. The collet pieces 33 have extensions 33' which are also adapted to bear on stop 38 when the device is in the relaxed position. Stop 38 may comprise a collar to washer 39 fitted into the main housing so as to engage shoulder 19'.

A third spring means 40 is operatively positioned between the collet pieces 33 and the circular housing forming the connecting piece to urge the collet pieces to the left as shown in the drawing so that the tapered surfaces 35 will engage the tapered portion 34 to force the pieces down on the serrations of the termination member to engage the member.

The operation of this form of the invention is as follows. As shown in FIG. 6A, when the device is in the relaxed position during which no force is applied to the actuation member, the bead 37 will rest on stop 38 under the force of the second spring 14. Third spring 40 will be compressed as the collet extensions 33' will also engage the stop 38. This will result in the collet pieces moving to the right relative to the housing 33 and tapered portion 34 allowing the collet pieces to move radially outwardly of the member whereby the collet pieces disengage from the termination member. The termination member 5 and cable 2 are then free to move with respect to the actuation member in the same manner as described with the form of the device illustrated in FIGS. 1–3.

Figure 6B:
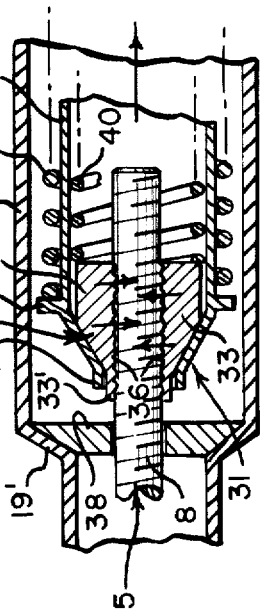
FIG. 6B is a view similar to FIG. 6A but illustrating the clutch in the locked position.
Figure 6A:
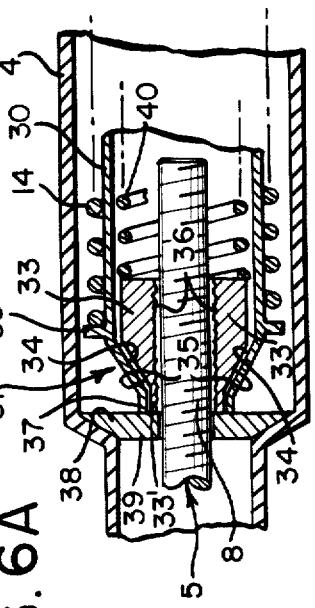
FIG. 6A is an enlarged view of a portion of FIG. 5 illustrating the clutch means in the unlocked position.

Application of an actuating force to the actuation member 3 will move it and the circular housing to the right as shown in FIG. 6B permitting tapered portion 34 to engage with tapered surfaces 35 of the collet pieces. This will in turn cause the pieces to move radially inwardly with respect to the termination member such that the serrations of the pieces will engage the serrations of the termination member such that there is locking engagement between the collet pieces and the member. Continued movement of the member 3 to the right will then cause movement of cable 2 to the right thus actuating a controlled member.

Upon release of the actuation force, second spring 14 will move the housing 30 to the left until bead 37 and extensions 33' contact stop 38 causing disengagement of the collet pieces from the termination member to disengage the collet from the member.

While the first spring 9 is shown in FIGS. 4 and 5 as being preferably operatively positioned between the termination member 5 and the main housing 4, it could as explained previously in connection with the device of FIGS. 1–3 be substituted by a spring in the controlled member exerting the same forces in the same direction. In addition, the second spring 14 is shown in the device of FIGS. 4–6 as being preferably operatively positioned between the main housing and the connecting member. It could however also be substituted by a return spring associated with a clutch or brake pedal tending to urge the member 3 towards the termination end 5.

The device of FIGS. 4–6 may be anchored against movement in the same manner as in the previously described device.

We claim:

1. Self-adjusting cable control device for automatically compensating for wear in a control cable system where the system includes a movable control cable connected at one of its ends to a controlled member and operatively connected at an opposite end to an actuation member through which a control force may be exerted on the controlled member; the improvement comprising in that said device includes a cable termination member adapted to connect with an end of a control cable, a connecting member adapted to connect with an actuation member, clutch means carried by said connecting member adapted to lock with said termination member, a main housing adapted to be anchored with respect to said control cable surrounding said termination member and said connecting member, first spring means for urging said termination member towards said clutch and said connecting member, second spring means operatively positioned between said main housing and said connecting member for urging said connecting member towards the termination member and urging the clutch to an unlocked position with respect to said termination member whereby when said clutch is unlocked with respect to said termination member, said termination member is free to move with respect to said clutch and connecting member to compensate for wear in a control cable system and when an actuation member is moved against the force of said second spring means, said clutch will lock with respect to said termination member to cause movement of said cable to actuate a controlled member, said clutch comprising an annular collar loosely surrounding said termination member and an ear portion on said collar contained within a slot on said connecting member whereby when an actuation member is moved to in turn move said connecting member against the force of said second spring means, said annular collar will tilt about said termination member to engage and lock with said termination member.

2. A self-adjusting cable control device according to claim 1 wherein said termination member has a serrated surface and the inside periphery of said annular collar has a serrated surface.

3. A self-adjusting cable control device according to claim 1 wherein said annular collar has a tab on the opposite thereof from said second spring means and wherein said main housing has a bearing surface against which said tab bears when said clutch is in the unlocked position with respect to said termination member to assure said collar is aligned with said termination member.

4. Self-adjusting cable control device for automatically compensating for wear in a control cable system where the system includes a movable control cable connected at one of its ends to a controlled member and operatively connected at an opposite end to an actuation member through which a control force may be exerted on the controlled member; the improvement comprising in that said device includes a cable termination member adapted to connect with an end of a control cable, a connecting member adapted to connect with an actuation member, clutch means carried by said connecting member adapted to lock with said termination member, a main housing adapted to be anchored with respect to said control cable surrounding said termination member and said connecting member, first spring means for urging said termination member towards said clutch and said connecting member, second spring means for urging said connecting member towards the termination member and urging the clutch to an unlocked position with respect to said termination member whereby when said clutch is unlocked with respect to said termination member, said termination member is free to move with respect to said clutch and connecting member to compensate for wear in a control cable system and when an actuation member is moved against the force of said second spring means, said clutch will lock with respect to said termination member to cause movement of said cable to actuate a controlled member, said clutch means comprising at least one radially and longitudinally movable collet piece surrounding said termination member and wherein said connecting member comprises a circular housing surrounding a collet piece with said circular housing having a tapered collet engaging portion, and including in addition a third spring means operatively positioned between a collet piece and said circular housing to urge said collet piece towards said tapered collet engaging portion, a stop in said main housing for limiting movement of said circular housing under the force of said second spring means, and an extension on said collet piece adapted to engage said stop to move said collet piece relative to said tapered portion against the force of said third spring means when said circular housing engages said stop whereby when said circular housing is moved by application of a force to an actuation member against the force of said second spring means, said tapered collet engaging portion will move against said collet to move it radially inwardly of the termination member into locking engagement therewith, and whereby when the force moving the actuation member is removed, said second spring means will move said circular housing until it bears against said stop and said extension will bear against said stop causing the collet piece to move relative to the tapered portion against the force of the third spring means and to move radially outwardly of the termination end to disengage therewith.

5. A self-adjusting cable control according to claim 4 wherein said termination member is serrated and wherein a portion of said collet engages with a serration.

6. A self-adjusting cable control device according to claim 4 wherein said first spring means is operatively positioned between said main housing and said termination member and wherein said second spring means is operatively positioned between said main housing and said circular housing.

* * * * *